Figure 1:
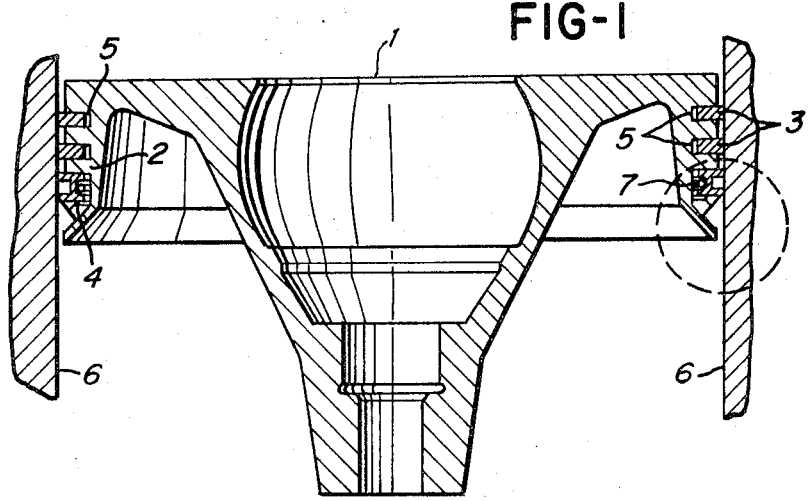

United States Patent
Elsbett et al.

[11] 3,733,973
[45] May 22, 1973

[54] PISTON, ESPECIALLY FOR COMPRESSION IGNITION ENGINES

[75] Inventors: Günter Elsbett; Ludwig Elsbett, both of Hippolstein, Germany

[73] Assignee: Maschinenfabrik Augsburg-Nurnberg Aktiengesellschaft Werk Nurnberg, Nurnberg, Germany

[22] Filed: Feb. 18, 1971

[21] Appl. No.: 116,466

[30] Foreign Application Priority Data

Feb. 21, 1970 Germany..................P 20 08 140.7

[52] U.S. Cl..................................92/159, 277/78
[51] Int. Cl. ...............................................F16j 1/08
[58] Field of Search...................92/158, 159, 160; 277/71, 75, 76, 78, 79, 216

[56] References Cited

UNITED STATES PATENTS

| | | | |
|---|---|---|---|
| 1,514,783 | 11/1924 | North | 277/78 |
| 1,605,040 | 11/1926 | Kreis | 92/160 |
| 1,737,658 | 12/1929 | Howe | 92/160 |
| 2,951,732 | 9/1960 | Brenneke | 277/79 |
| 3,276,782 | 10/1966 | Fuhrmann | 277/78 X |

FOREIGN PATENTS OR APPLICATIONS 964,507  2/1950  France..................277/78

Primary Examiner—Irwin C. Cohen
Attorney—Walter Becker

[57] ABSTRACT

A piston, especially for compression ignition engines, which has piston rings fitted to the piston head and at least one radially sprung oil control ring in which the space at the back of the oil control ring is by at least one return flow system connected with an annular space adjacent to the cylinder wall and divided from the interior of the cylinder.

4 Claims, 2 Drawing Figures

PATENTED MAY 22 1973 3,733,973

INVENTORS
GÜNTER ELSBETT
LUDWIG ELSBETT

PISTON, ESPECIALLY FOR COMPRESSION IGNITION ENGINES

This invention relates to a piston, in particular for compression ignition engines, having piston rings fitted to its sealing face and at least one radially spring-loaded control ring provided with at least one scraper edge sliding on a cylinder wall and several radial oil passages connecting the space on the front face of the oil control ring with the space at the back of the ring.

For the purpose of providing low-wear sliding contact guidance of a piston moving inside a cylinder, it is common practice in internal combustion engines and, specifically in compression ignition engines, to provide for the walls of the cylinder to be lubricated by means of an oil film and to protect this oil film from burning. Protection of the oil film is achieved in a manner that, as the piston head moves down on the power stroke, the said film is wiped down the cylinder wall by means of an oil scraper or oil control ring fitted to the piston head. In order to cause the oil film to be scraped off the cylinder wall, the oil control ring is sprung radially on the piston head, the radial spring load being commonly produced by a coil spring located in a space at the back of the oil control ring. Since the coil spring also needs to be protected from damage, i.e., it has to be lubricated, the oil control ring is provided with a number of radial passages through which part of the oil wiped down the cylinder wall can flow from the face of the oil control ring to where the ring spring is located. This proportion of the scraped-off oil can then pass through suitable ports in the body of the piston into the hollow interior of the piston. The other part of the oil film is carried downwards by the oil control ring as the piston descends on the down stroke. If, as is usual practice in high performance engines, provision is made for cooling the cylinder space under the piston or the piston, it is inevitable with this type of oil passages that cooling oil sprayed into the interior of the piston enters into the return flow passages for the scraped-down oil where it interferes with the return flow of the scraped-off oil. This tends to detrimentally affect the efficiency of the oil control ring in scraping off the oil from the cylinder wall causing a greater proportion of the lubricating oil to be burned and oil consumption to be increased (for status of the art see U. Schwab: Maschinenelementkolben, published in Motorrundschau No. 3, 1969, pp 134 and 135).

This problem is proposed to be solved by the present invention which has for its object a design of the piston in the zone of the oil control ring whereby interference with the flow of the scraped-off oil through the oil control ring by cooling oil is obviated.

According to this invention, this is achieved in a piston of the type described initially by having the space at the back of the oil control ring connected by at least one return flow system, which is separate from the oil control ring and directed back towards the cylinder wall, to an annular space adjacent to the cylinder wall and divided from the interior of the cylinder.

These features of the present invention make it possible with straightforward means to solve the problem which is the object of the invention and, moreover, to prevent heating of the cooling oil by mixing with the scraped-off oil or, where such mixture does take place in the cylinder, to keep this within limits. Owing to the fact that the cooling oil is positively prevented from getting into contact with the scraped-off oil inside the hollow piston, it is possible to effect cooling of the underside of the piston with absolutely cold oil, whereby optimum temperature control of the piston walls and, consequently, the piston itself can be obtained. An additional asset of this invention is that as a result of the cooling oil and the lubricating oil for the piston bore being kept separate, the rate of oil concumption is reduced.

An advantageous development of the invention is in the fact that the return flow system is made in the form of a skirt ring having a surface facing the cylinder wall and a supporting land for the oil control ring, said land being formed with a recess in the area of the oil passages, connecting the space at the back of the oil control ring with the annular space adjacent to the cylinder wall, and a clearance relative to the cylinder wall.

Further advantageous developments of the invention are disclosed in the sub-claims.

Figure 2:
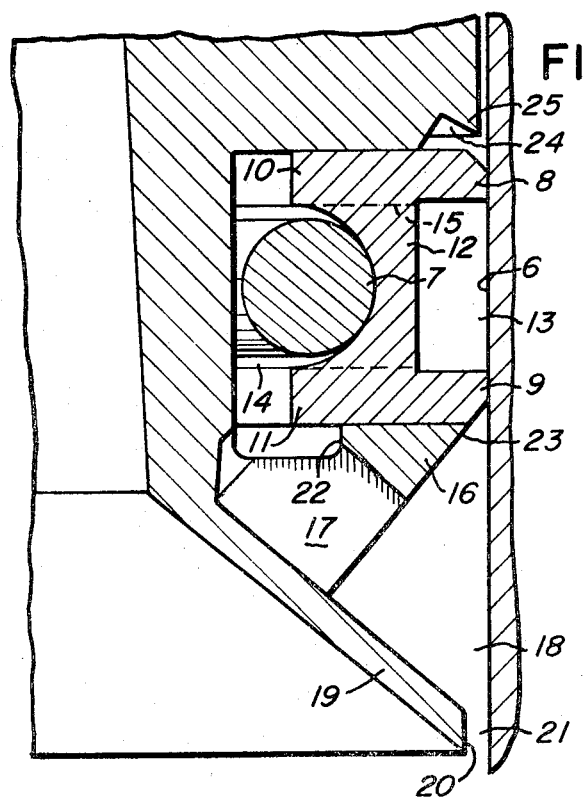

A typical embodiment of the invention is schematically shown in the drawing in which FIG. 1 is a longitudinal central section through a piston provided with an oil return system according to the invention, and FIG. 2 is an enlarged detail of the piston at the point of the oil control ring showing the oil control ring and an oil return flow system according to the invention as shown in FIG. 1.

The piston 1 according to the invention, of which only the head end is shown, is of the hollow type and provided with 2 or more piston rings 3 in series on its sealing face 2 and at least 1 oil control ring 4 arranged at a distance from these. The piston rings 3 and the oil control ring 4 are seated in ring grooves 5 in the sealing face 2 of the piston 1 and sprung radially so as to cause them to press against the wall of a cylinder bore 6 containing said piston. In contrast to the piston rings 3, which rely on inherent spring action, the oil control ring 4 is provided with a coil spring 7 bearing against the back of the ring to impart to it the necessary radial contact pressure. The oil control ring 4 is preferably of H-shaped cross-section with 2 of its flanges 8 and 9 facing the cylinder bore 6 and the other 2 flanges 10 and 11 extending towards the center of piston 1. The flanges 8 and 9 facing the cylinder bore 6 in conjunction with a web 12, which interconnects said flanges, and the cylinder bore form an annular space 13 which, for the purpose of this specification, is designated the front annular space on the outer face of the oil control ring 4. This annular space 13 communicates with another annular space 14 at the back of the oil control ring 4 through several openings 15 in the web 12. Located in the annular space 14 at the back of the oil control ring 4 between the flanges 10 and 11 extending towards the piston center, is a coil spring 7 which bears against the web 12 that connects said flanges for the purpose of pressing the oil control ring radially outwards against the cylinder wall 6. The annular space 14 existing at the back of the oil control ring 4 communicates through a return flow system 17, comprising several openings in a skirt ring 16, with an annular space 18 adjacent to the cylinder wall 6. This annular space 18 is formed by a conical skirt 19 at the end of the piston 1 away from the combustion chamber, the ring supporting land 16 and the cylinder bore 6. The outer edge 20 of the skirt 19 extends to a point close to the cylinder wall 6 leaving only a narrow gap 21 for the scraped-off oil emitted from the return flow system 17 and the annular space 18 respectively. The oil scraped off the cylinder wall 6 by the flange 8 of the oil control ring 4 collects in the annular space 13 in the outer face of the oil control ring and, passing through the openings 15 into the annular space 14 at the back of the oil control ring, returns through the return flow system 17 into the space 18 between the skirt 19 and the cylinder wall. Said annular space 18 also receives the oil collecting in the ring belt 24, which flows into the annular space 14 through oil galleries, as well as the oil scraped off by the flange 9 and passing through the clearance 23. Leaving the annular space 18 through the gap 21, the scraped-off oil flows along the cylinder wall 6 to a filter and, subsequently, to a cooler which are not shown in the drawing. After conditioning in the cooler and filter, the oil is returned to the cylinder wall 6 for lubrication.

The ring belt 24 provided on top of the oil control ring 4 features an additional scraper edge 25 to scrape off any oil which the oil control ring may fail to scrape off as well as oil galleries to the annular space 14, which galleries are not shown in the drawing.

The skirt ring land 16 supporting the oil scraper ring 4 is provided in the area of the return flow system 17 with a recess 22 for improved down-flow of the oil. In addition, the supporting land 16 is designed with a clearance 23 between its face and the cylinder wall 6 permitting the oil scraped off by flange 9 to flow into the annular space 18.

We claim

1. A piston, especially for an internal combustion engine of automatic ignition type, piston ring grooves formed in said piston, and piston rings mounted in said grooves and slidably engaging the wall of the cylinder in which the piston slides, one of said rings comprising an oil control ring having at least one scraper edge moving along the cylinder wall, spring means biasing said oil control ring radially outwardly on said piston, an annular space between the radially inner side of said oil control ring and the bottom of the groove in which said oil control ring is disposed, aperture means extending radially through said oil control ring for the flow of oil into said annular space, and means forming an oil return flow system for said piston comprising passage means inclined downwardly and leading from said annular space toward the periphery of said piston at the end thereof remote from the end of the piston facing the combustion chamber, said passage means at the end remote from said annular space terminating in an annular recess formed in said means forming the oil return flow system and opening radially outwardly, and a conical skirt portion forming the end of said piston and having a downwardly extending circumferential outer conical surface defining a wall of said annular recess and a downwardly extending inner conical surface, said inner and outer conical surfaces terminating in an edge defining a restricted clearance with the cylinder wall.

2. A piston according to claim 1, in which said downwardly extending outer conical surface has an inclination corresponding to the incline of said passage means.

3. A piston according to claim 1, in which an edge of the annular space is located at least partially below said oil control ring.

4. A piston according to claim 1, in which an oil collecting ring belt chamber is formed in said piston above said oil control ring.

* * * * *